US012673414B2

(12) United States Patent
Wada

(10) Patent No.: US 12,673,414 B2
(45) Date of Patent: Jul. 7, 2026

(54) WORKPIECE RETRIEVAL COUNT CALCULATION DEVICE, HAND SYSTEM, AND DISPLAY DEVICE

(71) Applicant: FANUC CORPORATION, Yamanashi (JP)

(72) Inventor: Jun Wada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 18/568,281

(22) PCT Filed: Jun. 17, 2021

(86) PCT No.: PCT/JP2021/023100
§ 371 (c)(1),
(2) Date: Dec. 8, 2023

(87) PCT Pub. No.: WO2022/264381
PCT Pub. Date: Dec. 22, 2022

(65) Prior Publication Data
US 2024/0269827 A1      Aug. 15, 2024

(51) Int. Cl.
*B25J 9/16* (2006.01)
*B25J 9/02* (2006.01)
*G05B 19/19* (2006.01)

(52) U.S. Cl.
CPC ............. *B25J 9/023* (2013.01); *B25J 9/1697* (2013.01); *G05B 19/19* (2013.01); *G05B 2219/40053* (2013.01); *G05B 2219/40613* (2013.01)

(58) Field of Classification Search
CPC ......... B25J 9/023; B25J 9/1697; G05B 19/19; G05B 2219/40053; G05B 2219/40613

USPC ................. 700/245–264; 318/568.11–568.25
See application file for complete search history.

(56) References Cited

U.S. PATENT DOCUMENTS

| | | | | |
|---|---|---|---|---|
| 10,773,386 B2 * | 9/2020 | Shimodaira | ............ | B25J 9/1687 |
| 11,027,433 B2 * | 6/2021 | Suzuki | ................... | B25J 19/023 |
| 11,142,398 B2 * | 10/2021 | Lert, Jr. | ............... | B65G 1/0478 |
| 11,681,977 B2 * | 6/2023 | Blohm | ................... | G06T 11/00 |
| | | | | 705/339 |
| 2015/0192774 A1 * | 7/2015 | Watanabe | .............. | G06Q 10/08 |
| | | | | 345/8 |
| 2017/0313514 A1 * | 11/2017 | Lert, Jr. | ............... | B65G 1/0492 |

(Continued)

FOREIGN PATENT DOCUMENTS

| | | |
|---|---|---|
| JP | 2001-300878 A | 10/2001 |
| JP | 2007-179301 A | 7/2007 |

(Continued)

*Primary Examiner* — Jaime Figueroa
(74) *Attorney, Agent, or Firm* — HAUPTMAN HAM, LLP

(57) ABSTRACT

This workpiece retrieval count calculation device comprises: a three-dimensional information acquisition unit for acquiring three-dimensional information pertaining to a subject space in which a plurality of workpieces are loaded; a workpiece shape information acquisition unit for acquiring shape information pertaining to the workpieces; and a workpiece retrieval count calculation unit for calculating a range of workpiece retrieval counts, in consideration of cavities within a workpiece loading region, on the basis of the three-dimensional information pertaining to the subject space and the shape information pertaining to the workpieces from before and after retrieval of the workpieces.

15 Claims, 17 Drawing Sheets

(56)          References Cited

U.S. PATENT DOCUMENTS

| | | | | |
|---|---|---|---|---|
| 2018/0250823 | A1* | 9/2018 | Shimodaira | B25J 9/1612 |
| 2019/0033067 | A1* | 1/2019 | Yamagami | G01B 11/2513 |
| 2019/0220807 | A1* | 7/2019 | Yoshida | G06F 1/163 |
| 2019/0315578 | A1* | 10/2019 | Moriya | B25J 9/1605 |
| 2019/0351557 | A1* | 11/2019 | Suzuki | B25J 9/1697 |
| 2020/0167886 | A1* | 5/2020 | Cho | G06T 1/0014 |
| 2020/0371217 | A1* | 11/2020 | Namba | G01S 7/497 |
| 2021/0334749 | A1* | 10/2021 | Blohm | G06T 11/00 |
| 2022/0331047 | A1* | 10/2022 | Shelton, IV | G06F 3/011 |

FOREIGN PATENT DOCUMENTS

| | | | |
|---|---|---|---|
| JP | 2017-520417 | A | 7/2017 |
| JP | 2018-144156 | A | 9/2018 |
| JP | 2019-150904 | A | 9/2019 |
| JP | 2019-198950 | A | 11/2019 |
| JP | 2020-021212 | A | 2/2020 |

* cited by examiner

FIG. 2

BEFORE PICK-UP

AFTER PICK-UP

Figure 5:
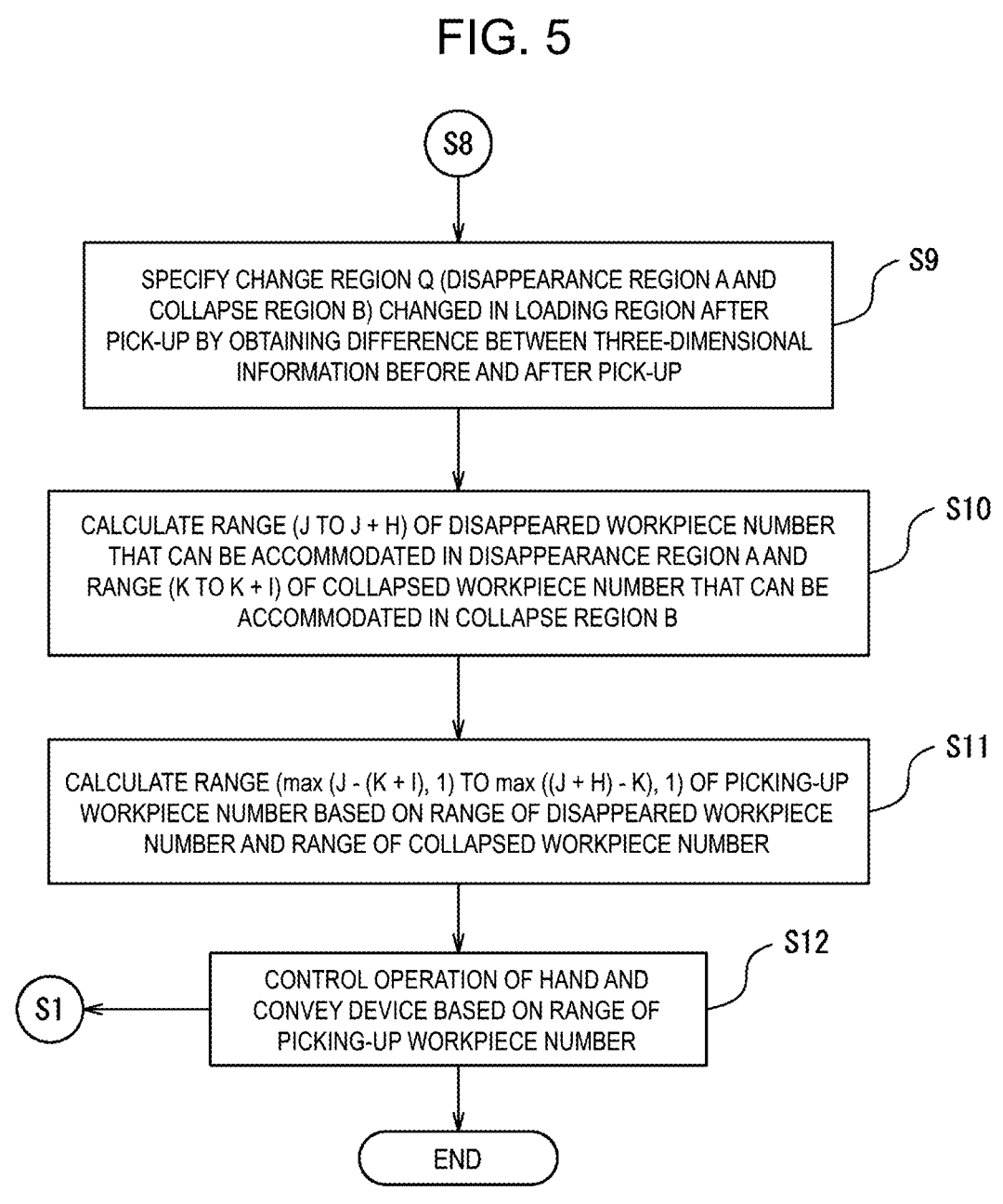

SPECIFY CHANGE REGION Q (DISAPPEARANCE REGION A AND COLLAPSE REGION B) CHANGED IN LOADING REGION AFTER PICK-UP BY OBTAINING DIFFERENCE BETWEEN THREE-DIMENSIONAL INFORMATION BEFORE AND AFTER PICK-UP — S9

↓

CALCULATE RANGE (J TO J + H) OF DISAPPEARED WORKPIECE NUMBER THAT CAN BE ACCOMMODATED IN DISAPPEARANCE REGION A AND RANGE (K TO K + I) OF COLLAPSED WORKPIECE NUMBER THAT CAN BE ACCOMMODATED IN COLLAPSE REGION B — S10

↓

CALCULATE RANGE (max (J - (K + I), 1) TO max ((J + H) - K), 1) OF PICKING-UP WORKPIECE NUMBER BASED ON RANGE OF DISAPPEARED WORKPIECE NUMBER AND RANGE OF COLLAPSED WORKPIECE NUMBER — S11

↓

(S1) ← CONTROL OPERATION OF HAND AND CONVEY DEVICE BASED ON RANGE OF PICKING-UP WORKPIECE NUMBER — S12

↓

( END )

BEFORE PICK-UP

AFTER PICK-UP

BEFORE PICK-UP

AFTER PICK-UP

BEFORE PICK-UP

AFTER PICK-UP

BEFORE PICK-UP

AFTER PICK-UP

WORKPIECE RETRIEVAL COUNT CALCULATION DEVICE, HAND SYSTEM, AND DISPLAY DEVICE

RELATED APPLICATIONS

The present application is a National Phase of International Application No. PCT/JP2021/023100 filed Jun. 17, 2021.

TECHNICAL FIELD

The present invention relates to a hand technology, and particularly relates to a picking-up workpiece number calculation device, a hand system, and a display device.

BACKGROUND ART

As a pick-and-place hand, various types of hands such as a multi-finger gripping type, a magnetic suction type, a vacuum suction type, and a Bernoulli type are known. In an application for picking up one or a desired number of workpieces from among a plurality of bulk or stacked workpieces, the position (and orientation as necessary) of the workpiece is detected using a vision sensor. As the vision sensor, a three-dimensional vision sensor using various principles such as a triangulation method, a time of flight (TOF) method, and a focusing method is used. However, in the case of a small workpiece, a thin plate-shape workpiece, a sheet-shape workpiece, or an easily adhesive workpiece, the hand may erroneously pick-up a plurality of workpieces at a time. Calculation methods of the picking-up workpiece number include a calculation method using an additional sensor such as a force sensor, an electromagnetic induction type sensor, a pressure sensor, or a photoelectric sensor after picking up the workpieces. However, if additional measurement is performed by a sensor separate from the vision sensor, the cycle time increases. Since an additional sensor is required separately from the vision sensor, the system becomes complicated and the cost increases.

On the other hand, when the picking-up workpiece number is calculated using a vision sensor, a method of calculating the picking-up workpiece number by dividing a difference in three-dimensional information (i.e., a volume difference) such as a distance image and three-dimensional point cloud data before and after a picking-up workpiece by a volume per workpiece is known (see Patent Document 1 described later). However, in a case of a plurality of bulk or stacked workpieces, it is not possible to find whether a workpiece exists or a cavity exists in a region invisible from the vision sensor, and therefore it is not possible to determine whether the difference in the three-dimensional information before and after picking-up a workpiece is a difference caused by erroneously picking-up a plurality of workpieces at a time or a difference caused by exposing the cavity portion. Therefore, the picking-up workpiece number obtained by dividing the difference in the three-dimensional information before and after picking-up a workpiece by the volume per workpiece does not necessarily become an accurate value. As prior art related to the present application, the following documents are disclosed.

Patent Document 1 describes a method and a device of detecting collapse of an article generated when the article is transferred by a picking robot, in which a volume difference of an article group before and after transfer work is estimated from a distance image before work and a distance image after work generated based on a three-dimensional measurement means, the estimated volume difference of the article group is divided by a volume per article calculated from article shape data to compare the number of actually transferred articles with a desired number to be transferred, and whether or not collapse occurs after all processes of the transfer work is determined based on a degree of coincidence thereof.

Patent Document 2 states that a robot manipulator including a suction gripper lifts and moves a box using a 3D sensor that detects information regarding an environment.

Patent Document 3 describes a method of holding a plurality of workpieces loaded in bulk inside a pallet by a predetermined number at the tip of a robot arm and picking-up the workpieces to the outside of the pallet, in which the number of remaining workpieces when a workpiece absent region is generated at the pallet bottom is substantially uniformly determined depending on the size of the pallet, and therefore the picking-up workpiece number when the number of workpieces becomes the remaining number is calculated in advance by back calculation.

CITATION LIST

Patent Literature

[PTL 1] JP 2007-179301 A
[PTL 2] JP 2017-520417A
[PTL 3] JP 2001-300878A

SUMMARY OF INVENTION

Technical Problem

In view of the known problems, an object of the present invention is to provide a technology for accurately estimating the picking-up workpiece number.

Solution to Problem

One aspect of the present disclosure provides a picking-up workpiece number calculation device including: a three-dimensional information acquiring unit configured to acquire three-dimensional information of a target space in which a plurality of workpieces are loaded; a workpiece shape information acquiring unit configured to acquire shape information of the workpiece; and a picking-up workpiece number calculating unit configured to calculate a range of a picking-up workpiece number based on the three-dimensional information of the target space before and after picking-up a workpiece and the shape information of the workpiece, in consideration of a cavity in a loading region of the workpiece.

Another aspect of the present disclosure provides a hand system including: a hand configured to pick-up and deliver a workpiece; a convey device configured to convey a workpiece using the hand; a controller configured to control operation of at least one of the hand and the convey device; and a vision sensor configured to output three-dimensional information of a target space in which a plurality of the workpieces are loaded, in which the controller includes: a three-dimensional information acquiring unit configured to acquire three-dimensional information of the target space from the vision sensor; a workpiece shape information acquiring unit configured to acquire shape information of the workpiece; a picking-up workpiece number calculating unit configured to calculate a range of a picking-up workpiece number in consideration of a cavity in a loading region of the workpiece based on three-dimensional information of the target space before and after picking-up a workpiece and the shape information of the workpiece; and an operation control unit configured to control operation of at least one of the hand and the convey device based on the range of the picking-up workpiece number.

Another aspect of the present disclosure provides a display device configured to visually display a calculating process of a picking-up number of workpieces picked-up from among a plurality of loaded workpieces, the display device including a display part configured to display a superimposed image in which a change region that has changed in a loading region of workpieces after picking-up a workpiece is superimposed on at least one of pieces of three-dimensional information of a target space before and after picking-up a workpiece.

Advantageous Effect of Invention

According to one aspect of the present disclosure, since the range of a picking-up workpiece number is calculated in consideration of a cavity in a workpiece loading region, the picking-up workpiece number can be accurately estimated.

BRIEF DESCRIPTION OF DRAWINGS

FIG. 2 is a block diagram of the hand system of the first embodiment.

FIG. 5 is a flowchart illustrating operation of the hand system of the first embodiment.

Figure 11:
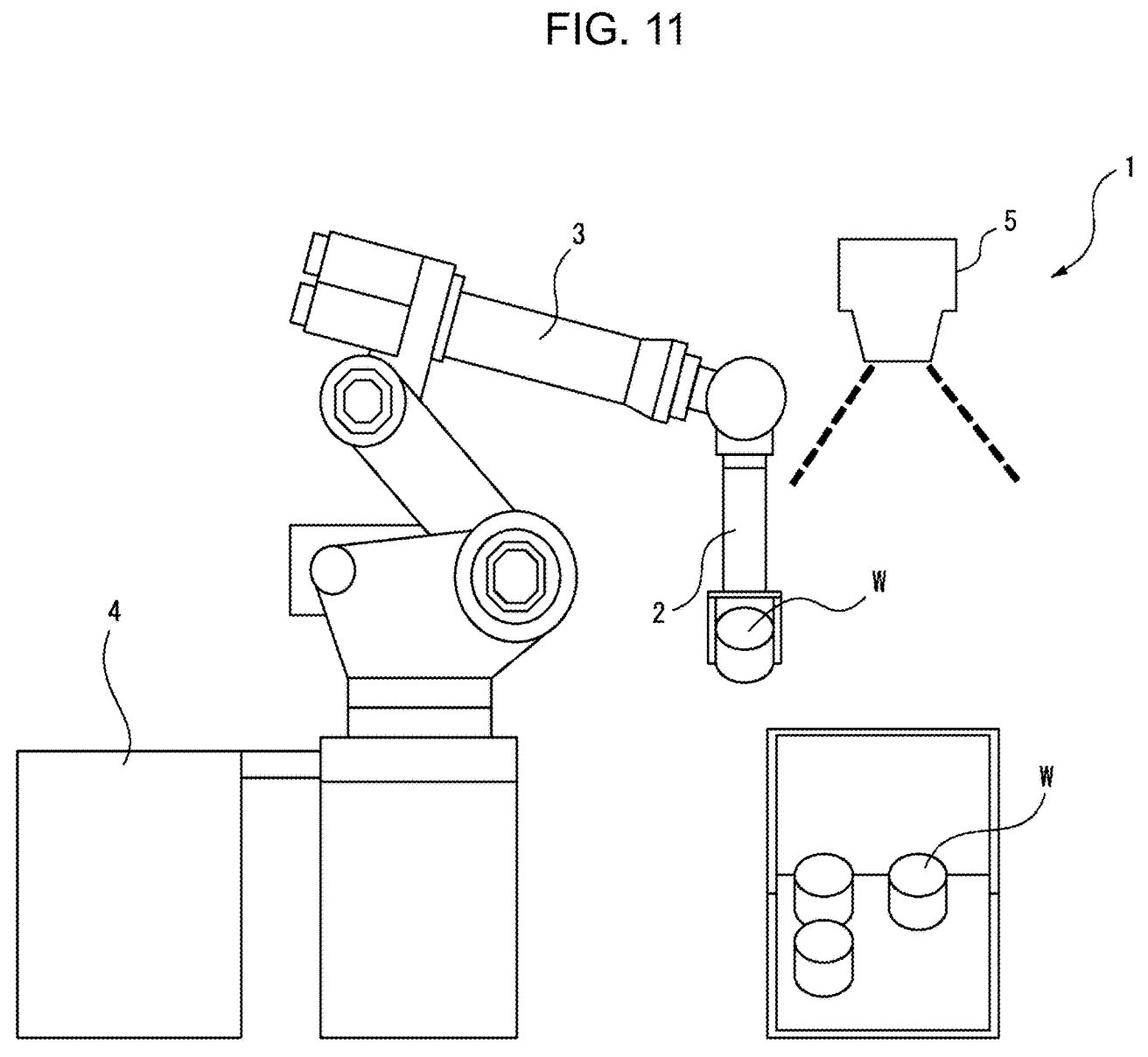

FIG. 11 is a configuration diagram of a hand system of a third embodiment.

FIG. 12 is a distance image view illustrating an example of three-dimensional information after picking-up a workpiece.

DESCRIPTION OF EMBODIMENTS

Figure 1:
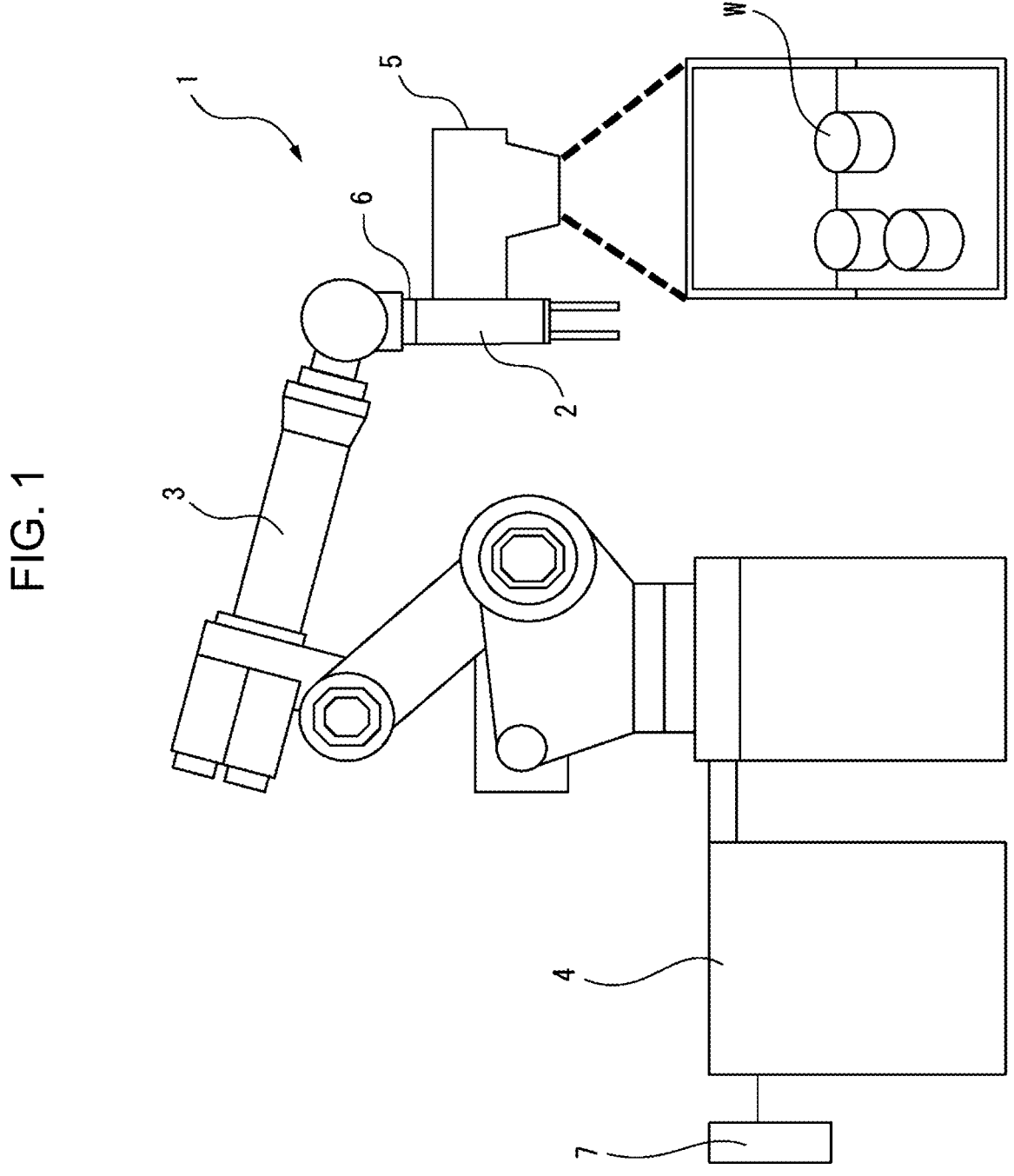
FIG. 1 is a configuration diagram of a hand system of a first embodiment.

Embodiments of the present disclosure will be described in detail below with reference to the accompanying drawings. In the drawings, identical or similar constituent elements are given identical or similar reference signs. Additionally, the embodiments to be described below are not intended to limit the technical scope of the invention or the meaning of terms set forth in the claims.

A hand system 1 of a first embodiment will be described below. FIG. 1 is a configuration diagram of the hand system 1 of the first embodiment. The hand system 1 includes a hand 2, a convey device 3, a controller 4, and a vision sensor 5. The hand system 1 may further include a registration sensor 6 and a display device 7. In the present embodiment, a plurality of workpieces W having a columnar shape are loaded (in bulk or stacked) in an accommodation object, but in other embodiments, the workpieces W may have other forms such as a rectangular shape, a thin plate shape, and a sheet shape, and the workpieces W may be loaded on a jig. The hand system 1 detects the position (and orientation as necessary) of the workpiece W based on three-dimensional information of the vision sensor 5. Based on the position (and orientation as necessary) of the workpiece W, the hand system 1 performs control of moving the convey device 3 to a workpiece pick-up position and operating the hand 2 to pick-up the workpiece W. When picking-up the workpiece W, the hand 2 may erroneously pick-up the workpieces W whose number is different from a desired number (1 in the present embodiment) of workpieces W. Therefore, the hand system 1 calculates the range of the picking-up workpiece number based on the three-dimensional information of the vision sensor 5. Based on the calculated range of the picking-up workpiece number, the hand system 1 performs control of moving the convey device 3 to a workpiece delivery position and operating the hand 2 to deliver the workpiece W.

The hand 2 is attached to the convey device 3. The hand 2 picks-up and delivers the workpiece W. The hand 2 includes a multi-finger gripping type, a magnetic suction type, a vacuum suction type, and a Bernoulli type. The hand 2 is preferably selected as appropriate according to the material, shape, size, and the like of the workpiece W. For example, a multi-finger gripping type hand may be used when the friction coefficient of the workpiece W is high, a magnetic suction type hand may be used when the workpiece is a magnetic body, a vacuum suction type hand may be used when the workpiece is large or has a thin plate shape, and a Bernoulli type hand may be used when the workpiece is light or has a sheet shape. The hand 2 of the present embodiment is a multi-finger gripping type hand, and picks-up and delivers the workpiece W by operating a plurality of fingers that can move relatively. The hand 2 includes a motor that operates a plurality of fingers and a motor drive device, and the motor drive device is connected to the controller 4 in a wired or wireless manner.

The convey device 3 conveys the workpiece W using the hand 2. The convey device 3 includes a robot, a conveyor, and an automatic guided vehicle (AGV). The convey device 3 of the present embodiment is a vertical articulated robot, but the convey device 3 may be a horizontal articulated robot, an orthogonal robot, a parallel link robot, a humanoid, or the like in other embodiments. The convey device 3 of the present embodiment includes a plurality of links coupled to be relatively movable, and conveys the workpiece W by operating the plurality of links. The convey device 3 includes a motor that operates a link and a motor drive device, and the motor drive device is connected to the controller 4 in a wired or wireless manner.

The controller 4 controls operation of at least one of the hand 2, the convey device 3, and the vision sensor 5. The controller 4 of the present embodiment controls the operation of all of the hand 2, the convey device 3, and the vision sensor 5, but, in other embodiments, the controller 4 may control the operation of only the hand 2 and the convey device 3, and an external device (not illustrated) connected communicably to the controller 4 in a wired or wireless manner may control the operation of the vision sensor 5. The controller 4 is a computer device including a processor and a memory. The processor of the present embodiment includes a semiconductor integrated circuit such as a central processing unit (CPU) or a micro processing unit (MPU) that executes a computer program, but, in other embodiments, the processor may be another semiconductor integrated circuit such as a field programmable gate array (FPGA) or an application specific integrated circuit (ASIC) that does not execute a computer program. The memory of the present embodiment is a semiconductor integrated circuit such as a random access memory (RAM) or a read only memory (ROM) that stores various data.

The vision sensor 5 measures and outputs three-dimensional information of a target space including a workpiece loading region in which the plurality of workpieces W are loaded (in bulk or stacked). The vision sensor 5 includes a three-dimensional vision sensor using various principles such as a triangulation method, a TOF method, and a focusing method. Alternatively, the vision sensor 5 may be a three-dimensional vision sensor in which a distance sensor and a two-dimensional camera are combined. The vision sensor 5 of the present embodiment is a TOF sensor that outputs a distance image. The vision sensor 5 is attached to the hand 2 or the convey device 3. The vision sensor 5 of the present embodiment is attached to the hand 2, but, in other embodiments, the vision sensor 5 may be installed at a fixed point that is a different place from the hand 2 or the convey device 3.

It should be noted that the registration sensor 6 is not an essential constituent element. The registration sensor 6 outputs registration information indicating whether or not one or more workpieces W have been picked-up by the hand 2. The registration sensor 6 includes a force sensor, an electromagnetic induction type sensor, a pressure sensor, or a photoelectric sensor, a camera, and a three-dimensional sensor. As described in an embodiment described later, the vision sensor 5 may also be used as the registration sensor 6. The registration sensor 6 of the present embodiment is a force sensor that detects force. The registration sensor 6 outputs force sense information as the registration information. The registration sensor 6 is attached to the hand 2 or the convey device 3, but, in other embodiments, the registration sensor 6 may be installed at a fixed point that is a different place from the hand 2 or the convey device 3.

It should be noted that the display device 7 is not an essential configuration. The display device 7 visually displays a calculation process of the picking-up workpiece number. The display device 7 includes a display part (not illustrated) including a liquid crystal display, an organic EL display, or a touch panel display using them. The display device 7 of the present embodiment is a teach device communicably connected to the controller 4, but is not limited to this. For example, in other embodiments, the display device 7 may be a display device or the like attached to an external device communicably connected to the controller 4 in a wired or wireless manner.

Figure 2:
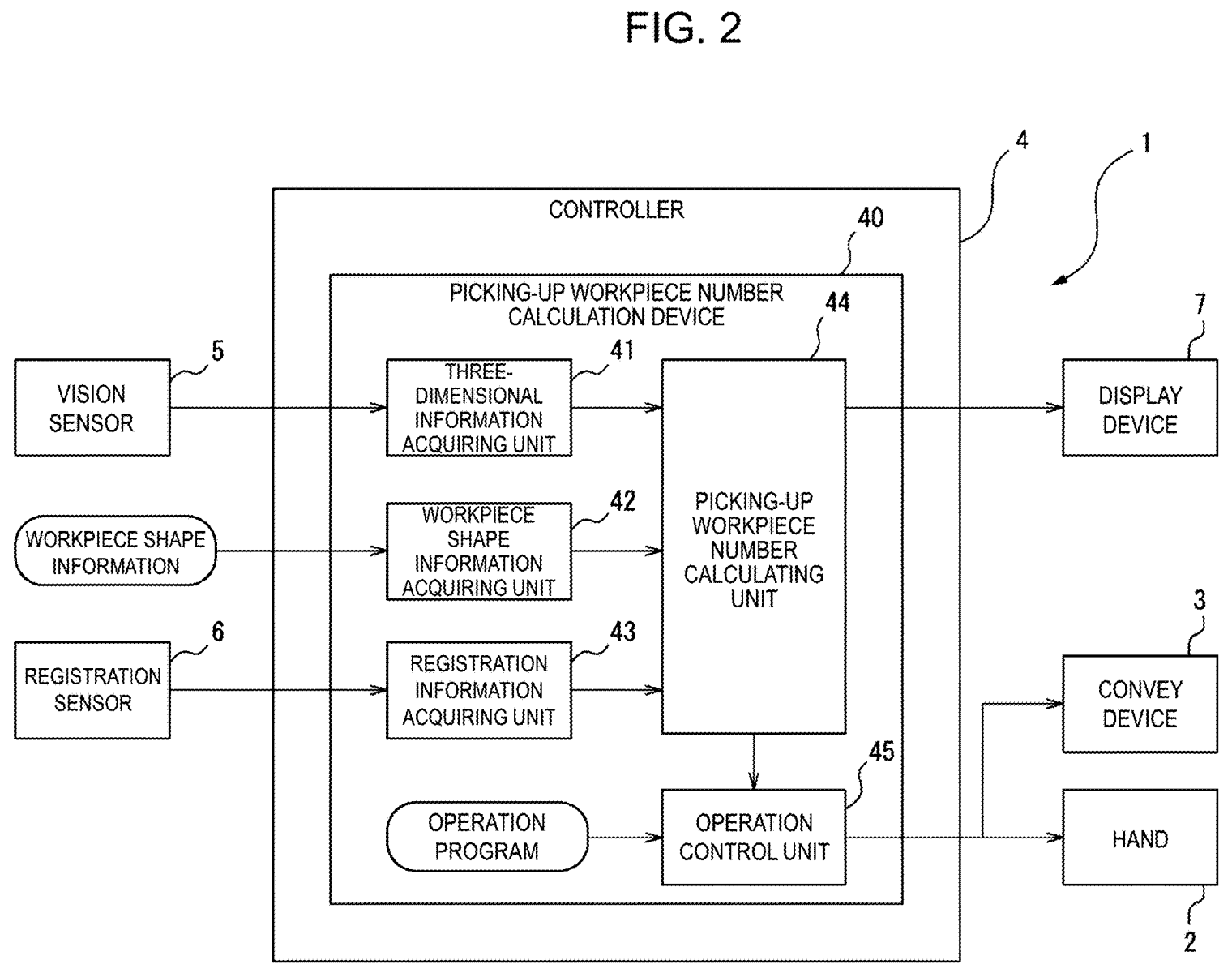

FIG. 2 is a block diagram of the hand system 1 of the first embodiment. The controller 4 of the present embodiment includes a picking-up workpiece number calculation device 40, but, in other embodiments, an external device (not illustrated) communicably connected to the controller 4 in a wired or wireless manner may include the picking-up workpiece number calculation device 40.

The picking-up workpiece number calculation device 40 is a computer device including a processor and a memory. The processor of the present embodiment includes a semiconductor integrated circuit such as a central processing unit (CPU) or a micro processing unit (MPU) that executes a computer program, but, in other embodiments, the processor may be another semiconductor integrated circuit such as a field programmable gate array (FPGA) or an application specific integrated circuit (ASIC) that does not execute a computer program. The memory of the present embodiment includes a semiconductor integrated circuit such as a random access memory (RAM) or a read only memory (ROM) that stores various data, but, in other embodiments, the memory may be a magnetic storage device such as a hard disk drive (HDD).

The picking-up workpiece number calculation device 40 includes a three-dimensional information acquiring unit 41, a workpiece shape information acquiring unit 42, and a picking-up workpiece number calculating unit 44. The picking-up workpiece number calculation device 40 may further include a registration information acquiring unit 43. The picking-up workpiece number calculation device 40 may further include an operation control unit 45. The "unit" in the present description includes a part or entirety of a computer program or a part or entirety of a semiconductor integrated circuit that does not execute the computer program. Based on three-dimensional information of the target space before and after picking-up a workpiece and the workpiece shape information, the picking-up workpiece number calculation device 40 calculates the range of the pick-up number of the workpieces W in consideration of the cavity in the loading region of the workpieces W.

The three-dimensional information acquiring unit 41 acquires, from the vision sensor 5, three-dimensional information of the target space in which the plurality of workpieces W are loaded (in bulk or stacked). The three-dimensional information includes a distance image including a distance value from a reference position for each pixel and three-dimensional point cloud data including a coordinate value of a three-dimensional coordinate system. The three-dimensional information of the present embodiment is a distance image output from the TOF sensor. The three-dimensional information acquiring unit 41 preferably includes a function of performing mutual data conversion between the distance image and another data format such as three-dimensional point cloud data. The three-dimensional information acquiring unit 41 sends the three-dimensional information of the target space to the picking-up workpiece number calculating unit 44.

The workpiece shape information acquiring unit 42 acquires workpiece shape information from an external memory or an internal memory. The workpiece shape information includes a three-dimensional shape model, a distance image, and three-dimensional point cloud data. The workpiece shape information of the present embodiment is a three-dimensional shape model such as three-dimensional computer-aided design (CAD) data. The workpiece shape information acquiring unit 42 preferably includes a function of performing mutual data conversion between the three-dimensional shape model and other data formats such as a distance image and three-dimensional point cloud data. The workpiece shape information acquiring unit 42 sends the workpiece shape information to the picking-up workpiece number calculating unit 44.

At least one of the three-dimensional information acquiring unit 41 and the workpiece shape information acquiring unit 42 preferably includes a function of matching parameters such as the size, scale, and coordinate system of one of the three-dimensional information of the target space and the workpiece shape information with parameters such as the size, scale, and coordinate system of the other for subsequent processing.

It should be noted that the registration information acquiring unit 43 is not an essential constituent element. The registration information acquiring unit 43 acquires, from the registration sensor 6, registration information indicating whether or not one or more workpieces W have been picked-up by the hand 2. The registration information of the present embodiment is force sense information of the force sensor, and when the force sense information exceeds gravity per workpiece W, the registration information acquiring unit 43 sends, to the picking-up workpiece number calculating unit 44, the registration information indicating that one or more workpieces W have been picked-up. In other embodiments, the picking-up workpiece number estimated by dividing the force sense information by the gravity per workpiece W may be sent to the picking-up workpiece number calculating unit 44 as the registration information.

Although not essential, when the registration information indicates that one or more workpieces W have been picked-up, the picking-up workpiece number calculating unit 44 executes calculation processing of the range of the picking-up workpiece number, and when the registration information indicates that no workpiece W has been picked-up, the picking-up workpiece number calculating unit 44 does not execute the calculation processing of the range of the picking-up workpiece number, and sends the picking-up workpiece number as 0 to the operation control unit 45. This can prevent unnecessary calculation processing by the picking-up workpiece number calculating unit 44. When the registration information includes the picking-up workpiece number, the picking-up workpiece number calculating unit 44 preferably checks, based on the picking-up workpiece number of the registration information, the calculated picking-up workpiece number when the calculated range of the picking-up workpiece number becomes one value (the minimum value and the maximum value are the same value) and becomes a desired pick-up number (there may be a plurality of picking-up workpiece numbers).

Figure 3A:
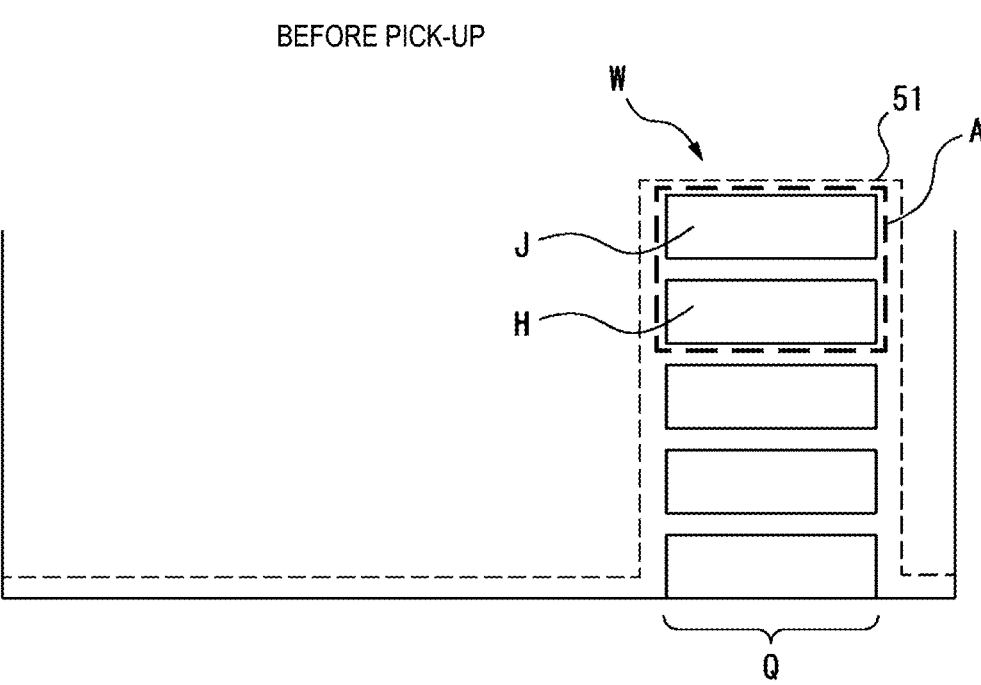
FIG. 3A is a side view of a workpiece loading region illustrating an example of the workpiece loading region before picking-up a workpiece.
Figure 3B:
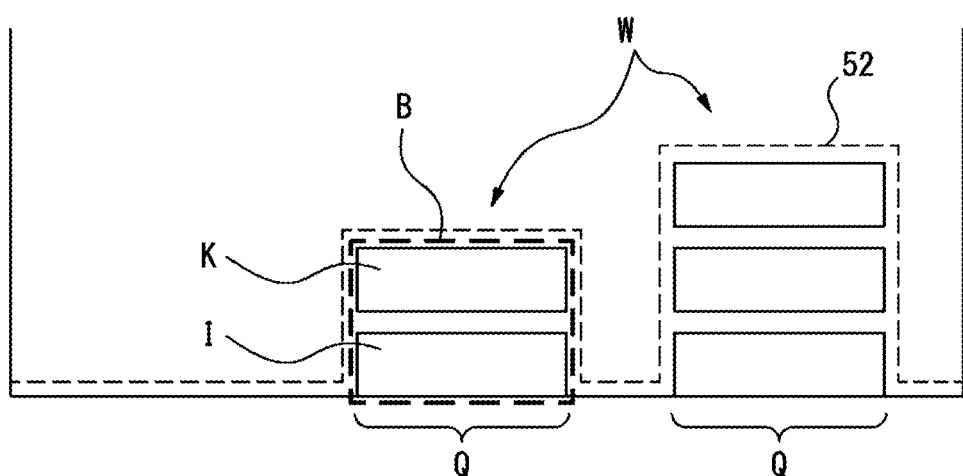
FIG. 3B is a side view of the workpiece loading region illustrating an example of the workpiece loading region after picking-up a workpiece.

The picking-up workpiece number calculating unit 44 calculates the range of the picking-up workpiece number in consideration of the cavity in the workpiece loading region based on the three-dimensional information of the target space before and after picking-up a workpiece and the workpiece shape information. Here, the calculation processing of the picking-up workpiece number of the first embodiment will be described with reference to FIGS. 3A and 3B. FIGS. 3A and 3B are side views illustrating an example of the workpiece loading region before and after picking-up a workpiece. FIG. 3A illustrates the workpiece loading region before picking-up a workpiece, in which all the rectangular workpieces W having short sides and long sides are laid down horizontally and stacked in the vertical direction. FIG. 3B illustrates the workpiece loading region after picking-up a workpiece, in which no workpiece W has been successfully picked-up and two workpieces W has collapsed. The vision sensor 5 images the workpiece loading region from above and outputs three-dimensional information 51 (indicated by broken line) before picking-up a workpiece and three-dimensional information 52 (indicated by broken line) after picking-up a workpiece.

It is not possible to determine whether the workpiece W exists in an invisible region that is invisible from the vision sensor 5 in the workpiece loading region or the cavity exists in the invisible region. Therefore, as a basic idea, by calculating the range of the picking-up workpiece number based on the presence of the cavity in a disappearance region A (indicated by thick broken line) that disappears from the workpiece loading region after picking-up a workpiece, it becomes possible to accurately estimate the picking-up workpiece number. That is, the picking-up workpiece number calculating unit 44 calculates the range of the disappeared workpiece number (1 to 2 in the example of FIG. 3A) that can be accommodated in the disappearance region A as a range of the picking-up workpiece number (1 to 2).

The disappearance region A is acquired as a difference region (positive region or negative region) by obtaining a difference between the three-dimensional information 51 and the three-dimensional information 52 of the target space before and after picking-up a workpiece. The maximum number of the disappeared workpiece number (2 in the example of FIG. 3A) that can be accommodated in the disappearance region A is obtained by repeatedly obtaining a difference of, from the disappearance region A, the workpiece W obtained from the workpiece shape information, or by dividing the volume of the disappearance region A by the volume per workpiece W obtained from the workpiece shape information. The minimum number of the disappeared workpiece number (1 in the example of FIG. 3A) that can be accommodated in the disappearance region A is obtained as 1 when the maximum number of the disappeared workpiece number is equal to or more than one, and as 0 when the maximum number of the disappeared workpiece number is zero.

However, as illustrated in FIG. 3B, the workpiece W may collapse after picking-up a workpiece due to the loading method of the workpiece W. It is not possible to determine whether the workpiece exists in the invisible region, which is invisible from the vision sensor 5, in the workpiece loading region or the cavity exists in the invisible region. Therefore, by calculating the range of the picking-up workpiece number also in consideration of the cavity in a collapse region B (indicated by thick broken line) newly appearing in the workpiece loading region after picking-up a workpiece, it is possible to more accurately estimate the picking-up workpiece number. That is, the picking-up workpiece number calculating unit 44 preferably calculates the range of the picking-up workpiece number in consideration of the range of the collapsed workpiece number (1 to 2 in the example of FIG. 3A) that can be accommodated in the collapse region B newly appearing in the workpiece loading region after picking-up a workpiece.

The collapse region B is acquired as a difference region (negative region or positive region) by obtaining a difference between the three-dimensional information 51 and the three-dimensional information 52 of the target space before and after picking-up a workpiece. The maximum number of the collapsed workpiece number (2 in the example of FIG. 3B) that can be accommodated in the collapse region B is obtained by repeatedly obtaining a difference of, from the collapse region B, the workpiece W obtained from the workpiece shape information, or by dividing the volume of the collapse region B by the volume per workpiece W obtained from the workpiece shape information. The minimum number of the collapsed workpiece number (1 in the example of FIG. 3B) that can be accommodated in the collapse region B is obtained as 1 when the maximum number of the collapsed workpiece number is equal to or more than one, and as 0 when the maximum number of the collapsed workpiece number is zero.

Next, it is preferable that the picking-up workpiece number calculating unit 44 subtract the minimum number of the collapsed workpiece number (1 in the example of FIG. 3B) from the maximum number of the disappeared workpiece number (2 in the example of FIG. 3A) to obtain the maximum value of the picking-up workpiece number (1), and subtract the maximum number of the collapsed workpiece number (2 in the example of FIG. 3B) from the minimum number of the disappeared workpiece number (1 in the example of FIG. 3A) to obtain the minimum value of the picking-up workpiece number (0 in the case of a negative number because −1 workpieces W cannot be picked-up), and thus calculate the range of the picking-up workpiece number (0 to 1). Therefore, the mathematical expression of a range R of the picking-up workpiece number is as follows.

[Math. 1]

$$R = \max(J - (K + I), 0) \sim \max((J + H) - K, 0) \qquad \text{Expression 1}$$

In Expression 1, J+H is the maximum number of the disappeared workpiece number, J is the minimum number of the disappeared workpiece number, K+I is the maximum number of the collapsed workpiece number, and K is the minimum number of the collapsed workpiece number. max (J−(K+I), 0) is the minimum value of the picking-up workpiece number, and max ((J+H)−K, 0) is the maximum value of the picking-up workpiece number. Note that max (argument 1, argument 2) function is a function that returns a larger value of the argument 1 and the argument 2. That is, the max function returns 0 when the maximum value or the minimum value of the picking-up workpiece number is calculated to be a negative number.

Note that when a loading method without a possibility of collapse of the workpieces W is adopted, it is not necessary to specify the collapse region B. In this case, the picking-up workpiece number calculating unit 44 may set the minimum number K of the collapsed workpiece number to 0, set the maximum number K+I of the collapsed workpiece number to 0, and calculate the range of the picking-up workpiece number (1 to 2) based only on the ranges J to J+H of the disappeared workpiece number (1 to 2 in the example of FIG. 3A) that can be accommodated in the disappearance region A.

When a loading method without a possibility of a cavity in the workpiece loading region is adopted, the minimum number J of the disappeared workpiece number may be set to the maximum number J+H of the disappeared workpiece number (2 in the example of FIG. 3A), the minimum number K of the collapsed workpiece number may be set to the maximum number K+I of the collapsed workpiece number (2 in the example of FIG. 3B), and the range of the picking-up workpiece number (0 to 0) may be calculated.

When determining whether or not to execute the calculation processing of the range of the picking-up workpiece number based on the registration information acquired from the registration information acquiring unit 43, since it is known that the picking-up workpiece number is always equal to or more than one, the picking-up workpiece number calculating unit 44 preferably changes max function so as to return 1 when the maximum value or the minimum value of the picking-up workpiece number is calculated to be 0 or less. In this case, the mathematical expression of the range R of the picking-up workpiece number is as follows.

[Math. 2]

$$R = \max(J - (K + I), 1) \sim \max((J + H) - K, 1) \qquad \text{Expression 2}$$

With reference to FIG. 2 again, although not essential, it is preferable that the picking-up workpiece number calculating unit 44 send, to the display device 7, a superimposed image in which a change region Q (including the disappearance region A and the collapse region B depending on the case) that has changed in the loading region of the workpiece W after picking-up a workpiece is superimposed on at least one of pieces of the three-dimensional information of the target space before and after picking-up a workpiece, and the display part of the display device 7 display the superimposed image sent from the picking-up workpiece number calculating unit 44. For example, the superimposed image may be a side view of the workpiece loading region as illustrated in FIGS. 3A and 3B. The display part preferably identifies and displays the change region Q, the disappearance region A, and the collapse region B depending on the case, for example, by color coding, different types of surrounding lines, display switching, or the like. This visualizes the calculation process of the picking-up workpiece number, and enables the presence or absence of a calculation error of the picking-up workpiece number to be confirmed.

Although not essential, it is preferable that the picking-up workpiece number calculating unit 44 send, to the display device 7, at least one of the range J to J+H of the disappeared workpiece number, the range K to K+I of the collapsed workpiece number depending on the case, the range R of the picking-up workpiece number, and the picking-up workpiece number when the maximum value and the minimum value of the range R of the picking-up workpiece number match, and the display part of the display device 7 display at least one of the range J to J+H of the disappeared workpiece number, the range K to K+I of the collapsed workpiece number depending on the case, the range R of the picking-up workpiece number, and the picking-up workpiece number when the maximum value and the minimum value of the range R of the picking-up workpiece number match that has been sent from the picking-up workpiece number calculating unit 44. Furthermore, although not essential, the picking-up workpiece number calculating unit 44 may send, to the display device 7, a superimposed image in which the shape model of the workpiece W is superimposed at the place that is the calculation basis of the range of the number (place denoted by J, H, K, I), and the display part of the display device 7 may display the superimposed image sent from the picking-up workpiece number calculating unit 44. This visualizes the calculation process of the picking-up workpiece number, and enables the presence or absence of a calculation error of the picking-up workpiece number to be confirmed.

The picking-up workpiece number calculating unit 44 sends, to the operation control unit 45, the calculated range R of the picking-up workpiece number. The operation control unit 45 controls the operation of at least one of the hand 2 and the convey device 3 according to an operation program of at least one of the hand 2 and the convey device 3. The operation control unit 45 controls (corrects) the operation of at least one of the hand 2 and the convey device 3 based on the range R of the picking-up workpiece number. That is, the operation control unit 45 gives the hand 2 and the convey device 3 a command for the operation of repeating picking-up and delivery of the workpieces W until the range R of the picking-up workpiece number becomes one value (the minimum value and the maximum value are the same value) and becomes the desired pick-up number. When the range R of the picking-up workpiece number is not one value or does not become the desired pick-up number, the operation control unit 45 gives the hand 2 and the convey device 3 a command for performing operation of delivering the workpiece W to the original place or a temporary placement stand and picking-up the workpiece W again, and when the range R of the picking-up workpiece number becomes one value and becomes the desired pick-up number, the operation control unit 45 gives the hand 2 and the convey device 3 a command for performing operation of conveying the workpiece W to the delivery position and delivering the workpiece W.

Figure 4:
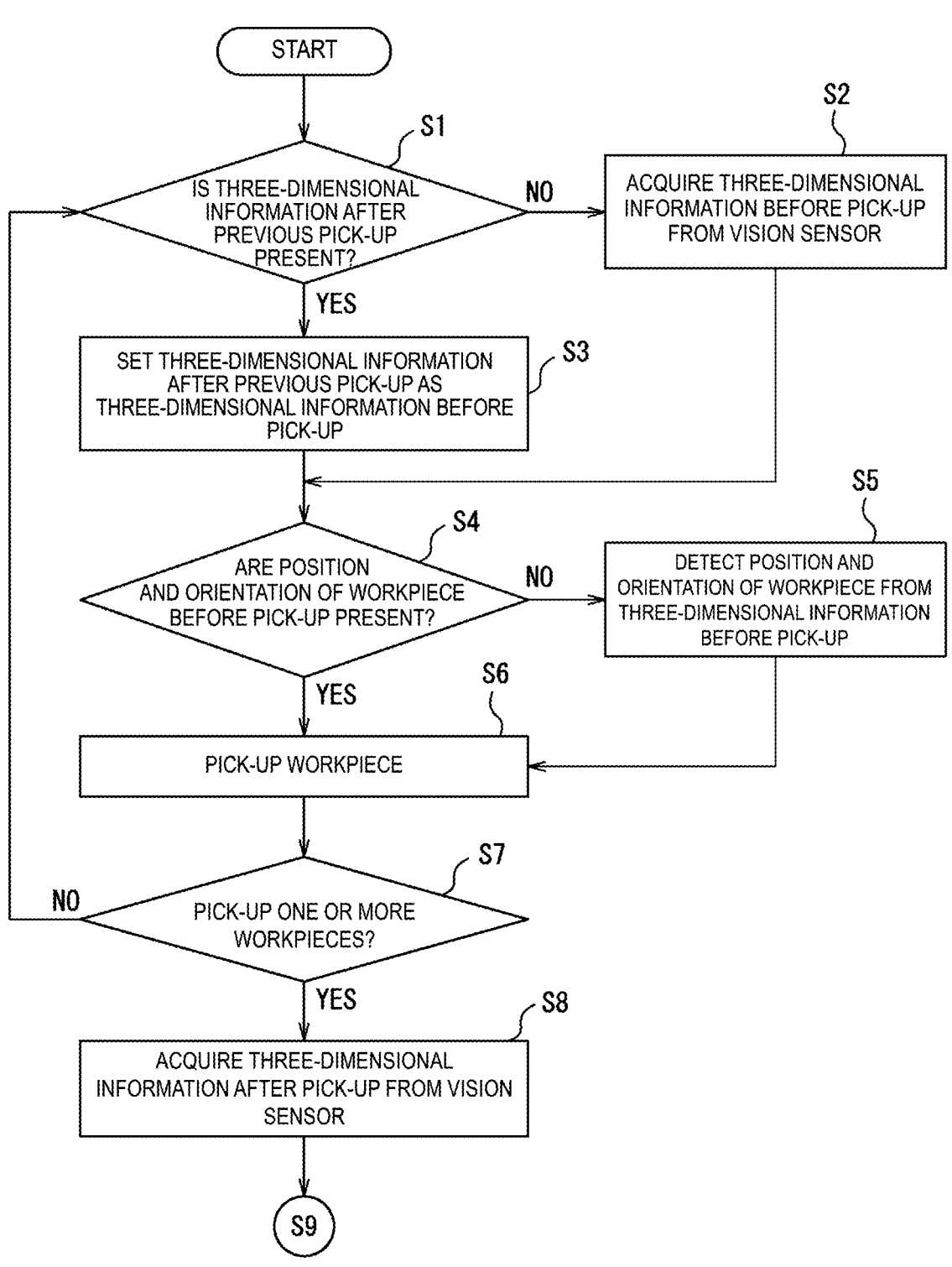
FIG. 4 is a flowchart illustrating operation of the hand system of the first embodiment.

FIGS. 4 and 5 are flowcharts illustrating the operation of the hand system 1 of the first embodiment. In step S1, it is determined whether or not three-dimensional information after picking-up a workpiece in the previous time is in the memory. When the three-dimensional information after picking up a workpiece in the previous time is not in the memory (NO in step S1), the three-dimensional information 51 of the target space before picking-up a workpiece is acquired from the vision sensor 5 in step S2. When the three-dimensional information after picking-up a workpiece in the previous time is in the memory (YES in step S1), the three-dimensional information after picking-up a workpiece in the previous time is set as the three-dimensional information 51 before picking-up a workpiece in step S3.

In step S4, it is determined whether or not the position (and orientation as necessary) of the workpiece W before picking-up a workpiece is in the memory. When the position (and orientation as necessary) of the workpiece W before picking-up a workpiece is not in the memory (NO in step S4), the position (and orientation as necessary) of the workpiece W is detected from the three-dimensional information 51 before picking-up a workpiece in step S5. When the position (and orientation as necessary) of the workpiece W in the three-dimensional information 51 before picking-up a workpiece is in the memory (YES in step S4), the process proceeds to step S6.

In step S6, the convey device 3 is moved to the workpiece pick-up position based on the position (and orientation as necessary) of the workpiece W, and the hand 2 is operated to pick-up the workpiece W. In step S7, it is determined whether or not one or more workpieces W have been picked-up based on the registration information of the registration sensor 6. However, it should be noted that step S7, which is for determining whether or not to execute the calculation processing of the range of the picking-up workpiece number based on the registration information, is not an essential step. When no workpiece W has been picked-up (NO in step S7), the process returns to step S1, and the workpiece W is picked-up again. When one or more workpieces W have been picked-up (YES in step S7), the process proceeds to step S8. In step S8, the three-dimensional information 52 after picking-up a workpiece is acquired from the vision sensor 5.

In step S9, the change region Q (including the disappearance region A and the collapse region B depending on the case) changed in the workpiece loading region after picking-up a workpiece is specified by obtaining a difference between the three-dimensional information 51 and the three-dimensional information 52 before and after picking-up a workpiece. The change region Q is a region that is not 0 after the difference is obtained. Unnecessary calculation processing can be prevented by limiting the subsequent processing of step S9 to the change region Q. The change region Q may be replaced with a circumscribed rectangle, a circumscribed circle, or the like circumscribed with the change region Q, or may be replaced with a circumscribed rectangle, a circumscribed circle, or the like according to the shape of the workpiece W. The change region Q may be limited using a region having a predetermined radius from the workpiece pick-up position.

When the positive region after the difference between the three-dimensional information 51 and the three-dimensional information 52 before and after picking-up a workpiece is obtained is the disappearance region A, the negative region becomes the collapse region B. On the other hand, when the negative region after the difference between the three-dimensional information 51 and the three-dimensional information 52 before and after picking-up a workpiece is obtained is the disappearance region A, the positive region becomes the collapse region B. However, when a loading method without a possibility of collapse of the workpieces W is adopted, it is not necessary to specify the collapse region B. Note that it is preferable to identify and display the change region Q, the disappearance region A, and the collapse region B depending on the case that are specified in step S9, for example, by color coding, different surrounding lines, display switching, or the like. This visualizes the calculation process of the picking-up workpiece number, and enables the presence or absence of a calculation error of the picking-up workpiece number to be confirmed. As subsequent processing of step S9, the position (and orientation as necessary) of the workpiece W after picking-up a workpiece in the change region Q is preferably detected and stored in the memory for picking-up a workpiece next time.

In step S10, based on the workpiece shape information, the range J to J+H of the disappeared workpiece number that can be accommodated in the disappearance region A and a range K to K+I of the collapsed workpiece number that can be accommodated in the collapse region B depending on the case are calculated. The maximum number J+H of the disappeared workpiece number is obtained by repeatedly obtaining a difference of, from the disappearance region A, the workpiece W obtained from the workpiece shape information, or by dividing the volume of the disappearance region A by the volume per workpiece W obtained from the workpiece shape information. The minimum number J of the disappeared workpiece number is obtained as 1 when the maximum number J+H of the disappeared workpiece number is equal to or more than one, and as 0 when the maximum number J+H of the disappeared workpiece number is zero. The maximum number K+I of the collapsed workpiece number is obtained by repeatedly obtaining a difference of, from the collapse region B, the workpiece W obtained from the workpiece shape information, or by dividing the volume of the collapse region B by the volume per workpiece W obtained from the workpiece shape information. The minimum number K of the collapsed workpiece number is obtained as 1 when the maximum number K+I of the collapsed workpiece number is equal to or more than one, and as 0 when the maximum number of the collapsed workpiece number is zero. Note that in step S10, the calculated range J to J+H of the disappeared workpiece number and the range K to K+I of the collapsed workpiece number calculated depending on the case are preferably displayed on the display device 7. As illustrated in FIGS. 3A and 3B, the superimposed image in which the shape model of the workpiece W is superimposed at the place (place denoted by J, H, K, I) that is the calculation basis of the range of the number may be displayed on the display device 7. This visualizes the calculation process of the picking-up workpiece number, and enables the presence or absence of a calculation error to be confirmed.

In step S11, the range R (max (J−(K+I), 1) to max ((J+H)−K, 1)) of the picking-up workpiece number is calculated based on the range of the disappeared workpiece number and the range of the collapsed workpiece number depending on the case. That is, the minimum number K of the collapsed workpiece number is subtracted from the maximum number J+H of the disappeared workpiece number to obtain the maximum value of the picking-up workpiece number, and the maximum number K+I of the collapsed workpiece number is subtracted from the minimum number J of the disappeared workpiece number to obtain the minimum value of the picking-up workpiece number, thereby calculating the range R of the picking-up workpiece number. However, when a loading method without a possibility of collapse of the workpieces W is adopted, the minimum number K of the collapsed workpiece number is set to 0, the maximum number K+I of the collapsed workpiece number is set to 0, and the range of the picking-up workpiece number is calculated based only on the range of the disappeared workpiece number. When it is not determined whether or not one or more workpieces W have been picked-up based on the registration information (when the process of step S7 is not performed), the range R of the picking-up workpiece number of equal to or more than zero is calculated based on max (J−(K+I), 0) to max ((J+H)−K, 0) of Expression 1. In step S11, the calculated range R of the picking-up workpiece number may be displayed on the display device 7.

In step S12, the operation of at least one of the hand 2 and the convey device 3 is controlled based on the range R of the picking-up workpiece number. The hand 2 and the convey device 3 are given a command for the operation of repeating picking-up and delivery of the workpieces W until the range R of the picking-up workpiece number becomes one value (the minimum value and the maximum value are the same value) and becomes the desired pick-up number. That is, when the range R of the picking-up workpiece number does not become one value or does not become the desired pick-up number, the workpiece W is delivered to the original place or the temporary placement stand, and the process returns to step S1 to pick-up the workpiece W again (step S6). When the range R of the picking-up workpiece number becomes one value and becomes the desired pick-up number, the workpiece W is conveyed to the delivery position and the workpiece W is delivered.

According to the hand system 1 of the first embodiment, since the range of the picking-up workpiece number is calculated in consideration of the cavity in the workpiece loading region (the disappearance region A and the collapse region B depending on the case), the picking-up workpiece number R can be accurately estimated.

A hand system 1 of the second embodiment will be described. The hand system 1 of the second embodiment is different from the hand system 1 of the first embodiment in that the picking-up workpiece number is calculated more precisely. It should be noted that the description for the same configuration and the same operation as those of the hand system 1 of the first embodiment will be omitted below.

Figure 6:
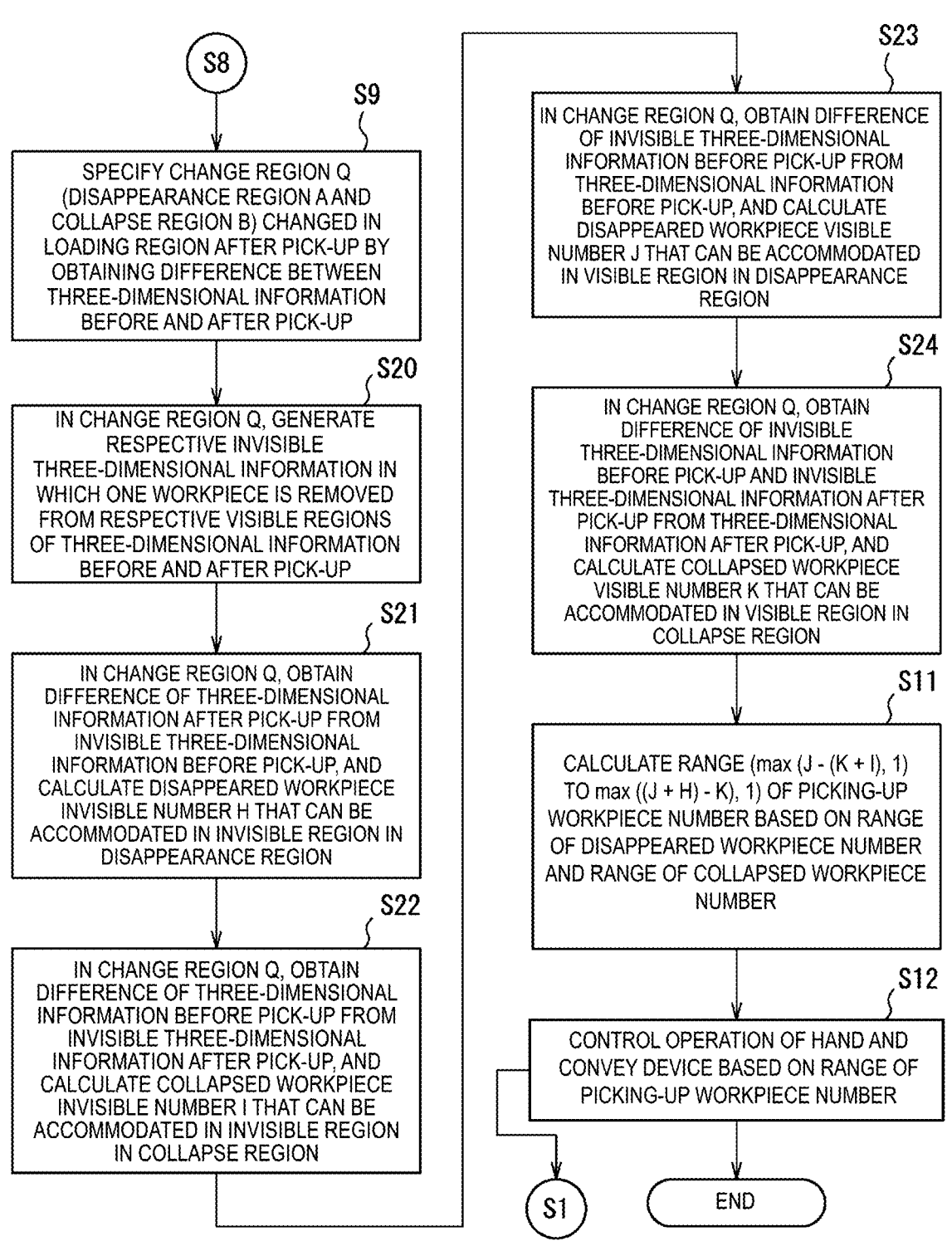
FIG. 6 is a flowchart illustrating operation of a hand system of a second embodiment.
Figure 7A:
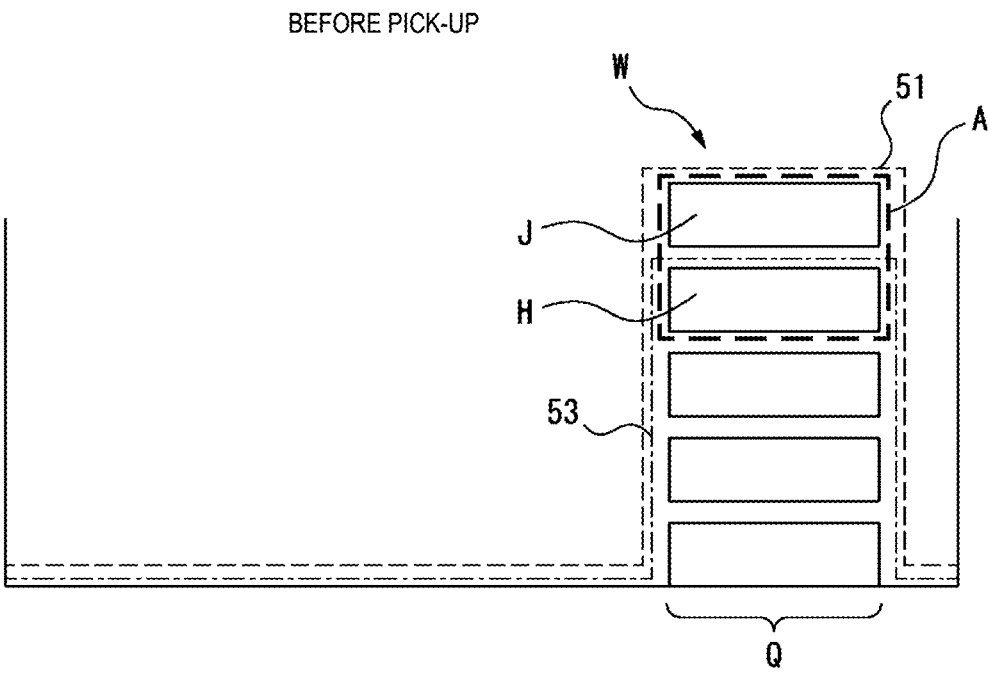
FIG. 7A is a side view illustrating an example of a workpiece loading region before picking-up a workpiece.
Figure 7B:
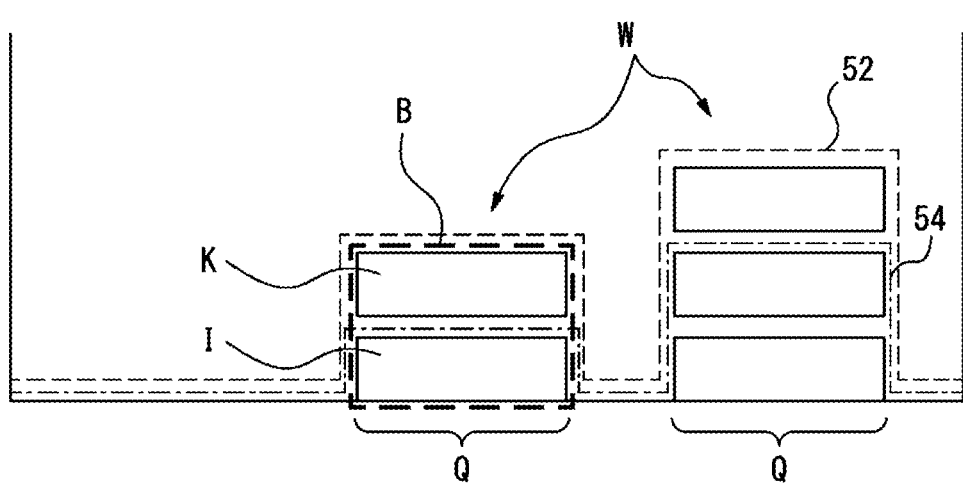
FIG. 7B is a side view illustrating an example of the workpiece loading region after picking-up a workpiece.

Here, the calculation processing of the picking-up workpiece number of the second embodiment will be described with reference to FIGS. 6, 7A, and 7B. FIG. 6 is a flowchart illustrating the operation of the hand system 1 of the second embodiment, and FIGS. 7A and 7B are side views illustrating an example of the workpiece loading region before and after picking-up a workpiece. The flowchart of FIG. 6 includes steps S20 to S24 for more precisely calculating the processing of step S10 of FIG. 4. FIGS. 7A and 7B illustrate the same workpiece loading region as that of FIGS. 3A and 3B.

In step S20, in the change region Q (including the disappearance region A and the collapse region B depending on the case), invisible three-dimensional information 53 and invisible three-dimensional information 54 (indicated by one-dot broken lines) in which one workpiece W is removed from the visible region visible from the vision sensor 5 of the three-dimensional information 51 and the three-dimensional information 52 before and after pick-up are generated respectively.

In step S21, in the change region Q, by obtaining a difference of the three-dimensional information 52 after pick-up from the invisible three-dimensional information 53 before pick-up, an invisible region (positive region) in the disappearance region A is specified, and a disappeared workpiece invisible number H that can be accommodated in the invisible region in the disappearance region A is calculated. The disappeared workpiece invisible number H is obtained by repeatedly obtaining a difference of, from the invisible region in the disappearance region A, the workpiece W obtained from the workpiece shape information, or by dividing the volume of the invisible region in the disappearance region A by the volume per workpiece W obtained from the workpiece shape information.

In step S22, in the change region Q, by obtaining a difference of the three-dimensional information 51 before pick-up from the invisible three-dimensional information 54 after pick-up, an invisible region (positive region) in the collapse region B is specified, and a collapsed workpiece invisible number I that can be accommodated in the invisible region in the collapse region B is calculated. The collapsed workpiece invisible number I is obtained by repeatedly obtaining a difference of, from the invisible region in the collapse region B, the workpiece W obtained from the workpiece shape information, or by dividing the volume of the invisible region in the collapse region B by the volume per workpiece W obtained from the workpiece shape information. However, when a loading method without a possibility of collapse of the workpieces W is adopted, step S22 becomes unnecessary.

In step S23, in the change region Q, by obtaining a difference of the invisible three-dimensional information 53 before pick-up from the three-dimensional information 51 before pick-up, a visible region (positive region) in the disappearance region A is specified, and a disappeared workpiece visible number J that can be accommodated in the visible region in the disappearance region A is calculated. The disappeared workpiece visible number J is obtained by repeatedly obtaining a difference of, from the visible region in the disappearance region A, the workpiece W obtained from the workpiece shape information, or by dividing the volume of the visible region in the disappearance region A by the volume per workpiece W obtained from the workpiece shape information.

In step S24, in the change region Q, by obtaining a difference of the invisible three-dimensional information 53 before pick-up and the invisible three-dimensional information 54 after pick-up from the three-dimensional information 52 after pick-up, a visible region (positive region) in the collapse region B is specified, and a collapsed workpiece visible number K that can be accommodated in the visible region in the collapse region B is calculated. However, when a loading method without a possibility of collapse of the workpieces W is adopted, step S24 for calculating the collapsed workpiece visible number K becomes unnecessary. The collapsed workpiece visible number K is obtained by repeatedly obtaining a difference of, from the visible region in the collapse region B, the workpiece W obtained from the workpiece shape information, or by dividing the volume of the visible region in the collapse region B by the volume per workpiece W obtained from the workpiece shape information.

In step S11, the range R (max (J−(K+I), 1) to max ((J+H)−K, 1)) of the picking-up workpiece number is calculated based on the range (J to J+H) of the disappeared workpiece number and the range (K to K+I) of the collapsed workpiece number depending on the case. That is, the minimum number K of the collapsed workpiece number is subtracted from the maximum number J+H of the disappeared workpiece number to obtain the maximum value of the picking-up workpiece number, and the maximum number K+I of the collapsed workpiece number is subtracted from the minimum number J of the disappeared workpiece number to obtain the minimum value of the picking-up workpiece number, thereby calculating the range R of the picking-up workpiece number. However, when a loading method without a possibility of collapse of the workpieces W is adopted, the minimum number K of the collapsed workpiece number is set to 0, the maximum number K+I of the collapsed workpiece number is set to 0, and the range of the picking-up workpiece number is calculated based only on the range of the disappeared workpiece number. When it is not determined whether or not one or more workpieces W have been picked-up based on the registration information (when step S7 is not performed), the range R of the picking-up workpiece number of equal to or more than zero is calculated based on max (J−(K+I), 0) to max ((J+H)−K, 0) of Expression 1.

According to the hand system 1 of the second embodiment, by calculating the disappeared workpiece invisible number H that can be accommodated in the invisible region in the disappearance region A and the collapsed workpiece invisible number I that can be accommodated in the invisible region in the collapse region B depending on the case, since the range R of the picking-up workpiece number is more precisely calculated in consideration of the cavity in the workpiece loading region (the disappearance region A and the collapse region B depending on the case), the picking-up workpiece number R can be accurately estimated.

Figure 8A:
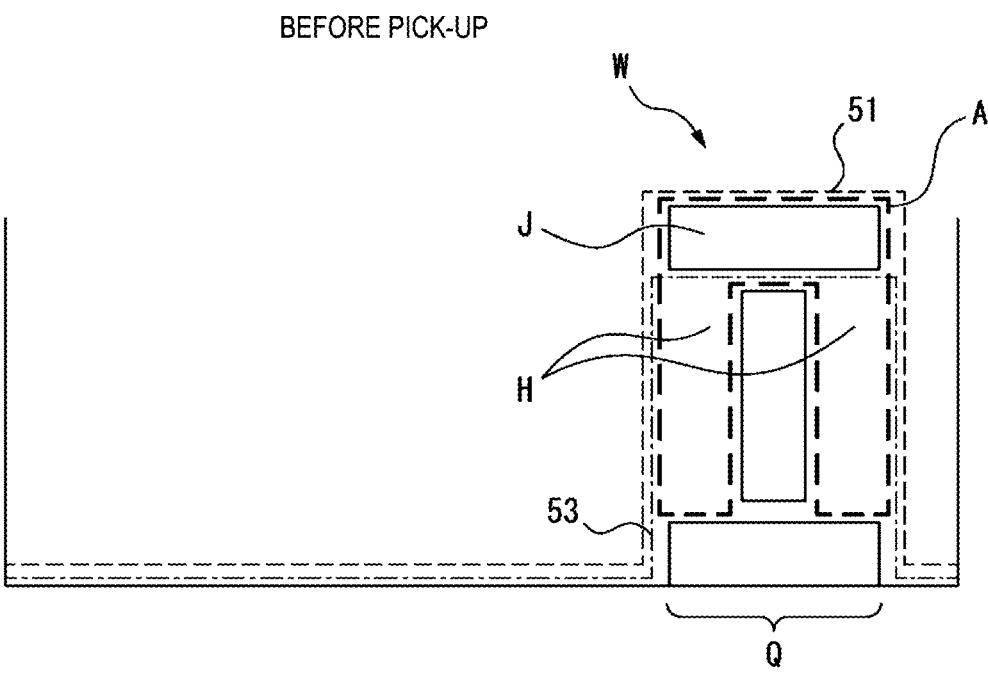
FIG. 8A is a side view illustrating another example of the workpiece loading region before picking-up a workpiece.
Figure 8B:
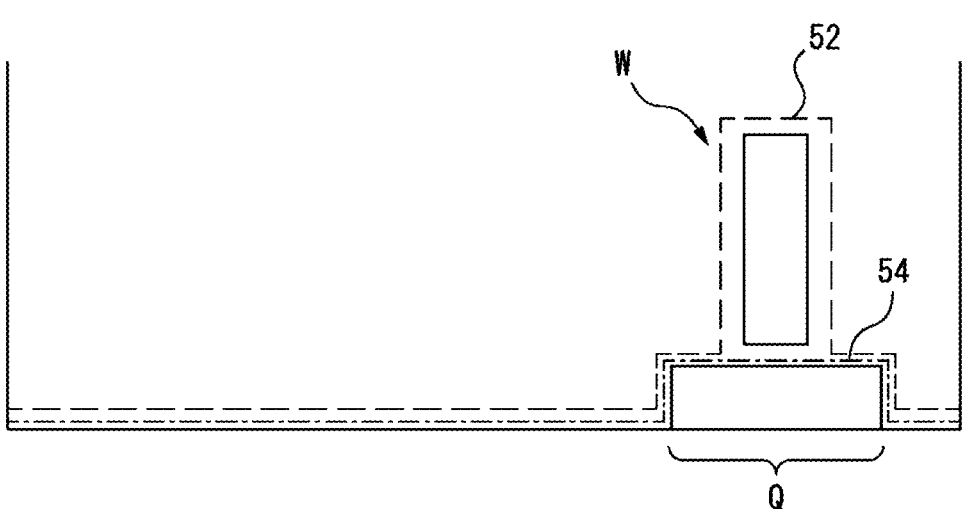
FIG. 8B is a side view illustrating another example of the workpiece loading region after picking-up a workpiece.

Hereinafter, another example of the workpiece loading region will be described. FIGS. 8A and 8B are side views illustrating another example of the workpiece loading region before and after picking-up a workpiece. FIG. 8A illustrates the workpiece loading region before picking-up a workpiece, in which three rectangular workpieces W having short sides and long sides are stacked in the vertical direction, one workpiece W in the middle is set vertically, the remaining two workpieces W are laid down horizontally, and cavities corresponding to two workpieces W are included. FIG. 8B illustrates the workpiece loading region after picking-up a workpiece, in which one workpiece W has been picked-up and no workpiece W has collapsed. The vision sensor 5 images the workpiece loading region from above and outputs three-dimensional information 51 (indicated by broken line) before picking-up a workpiece and three-dimensional information 52 (indicated by broken line) after picking-up a workpiece.

According to the calculation processing of the picking-up workpiece number of the first embodiment (see step S10), the range J to J+H of the disappeared workpiece number that can be accommodated in the disappearance region A becomes 1 to 3. Since the collapse region B does not exist, the range K to K+I of the collapsed workpiece number becomes 0. Therefore, the range R (max (J−(K+I), 1) to max ((J+H)−K, 1)) of the picking-up workpiece number becomes 1 to 3. Since the range R of the picking-up workpiece number has not become one value (the minimum value and the maximum value are the same value) or has not become the desired number (1 in the present embodiment, but the number may be plural), the workpiece W is delivered to the original place or the temporary placement stand, and the workpiece W is picked-up again.

According to the calculation processing of the picking-up workpiece number of the second embodiment (see steps S21 to S24), the disappeared workpiece invisible number H that can be accommodated in the invisible region in the disappearance region A becomes 2. Since the collapse region B does not exist, the collapsed workpiece invisible number I that can be accommodated in the invisible region in the collapse region B becomes 0. The disappeared workpiece visible number J that can be accommodated in the visible region in the disappearance region A becomes 1. Since the collapse region B does not exist, the collapsed workpiece visible number K that can be accommodated in the visible region in the collapse region B becomes 0. Therefore, the range R (max (J−(K+I), 1) to max ((J+H)−K, 1)) of the picking-up workpiece number becomes 1 to 3. Since the range R of the picking-up workpiece number has not become one value (the minimum value and the maximum value are the same value) or has not become the desired pick-up number (1 in the present embodiment), the workpiece W is delivered to the original place or the temporary placement stand, and the workpiece W is picked-up again.

Figure 9A:
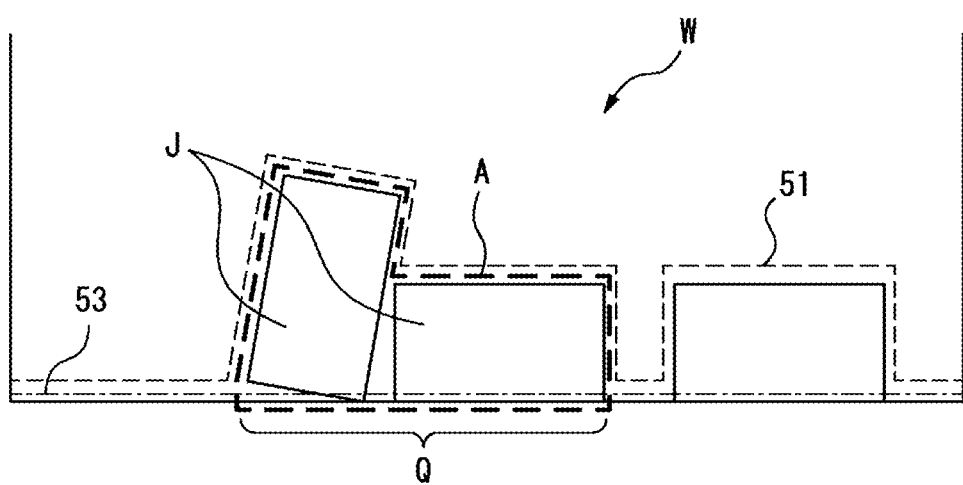
FIG. 9A is a side view illustrating another example of a workpiece loading region before picking-up a workpiece.
Figure 9B:
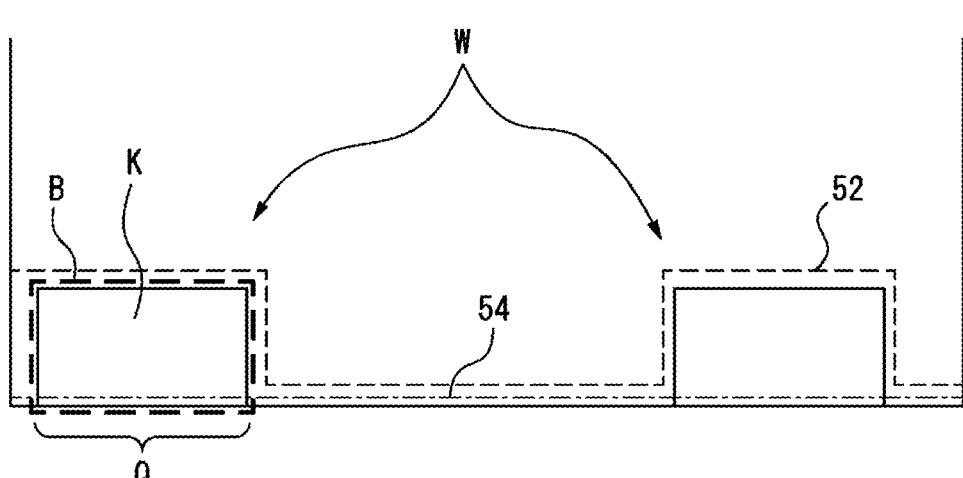
FIG. 9B is a side view illustrating another example of the workpiece loading region after picking-up a workpiece.

Another example of the workpiece loading region will be described. FIGS. 9A and 9B are side views illustrating another example of the workpiece loading region before and after picking-up a workpiece. FIG. 9A illustrates the workpiece loading region before picking-up a workpiece, in which three rectangular workpieces W having short sides and long sides are loaded in bulk in the horizontal direction, two workpieces W are laid down horizontally, and the remaining one workpiece W on the leftmost side leans against the workpiece W in the middle. FIG. 9B illustrates the workpiece loading region after picking-up a workpiece, in which one workpiece W in the middle has been picked-up and the workpiece W on the leftmost side has collapsed. The vision sensor 5 images the workpiece loading region from above and outputs three-dimensional information 51 (indicated by broken line) before picking-up a workpiece and three-dimensional information 52 (indicated by broken line) after picking-up a workpiece.

According to the calculation processing of the picking-up workpiece number of the first embodiment (see step S10), the range J to J+H of the disappeared workpiece number that can be accommodated in the disappearance region A becomes 2 to 2. The range K to K+I of the collapsed workpiece number that can be accommodated in the collapse region B becomes 1 to 1. Therefore, the range R (max (J−(K+I), 1) to max ((J+H)−K, 1)) of the picking-up workpiece number is 1 to 1. Since the range R of the picking-up workpiece number has become one value (the minimum value and the maximum value are the same value) and has become the desired pick-up number (1 in the present embodiment), the workpiece W is conveyed to the delivery position.

According to the calculation processing of the picking-up workpiece number of the second embodiment (see steps S21 to S24), since no invisible region exists in the disappearance region A, the disappeared workpiece invisible number H that can be accommodated in the invisible region in the disappearance region A becomes 0. Since no invisible region exists in the collapse region B, the collapsed workpiece invisible number I that can be accommodated in the invisible region in the collapse region B becomes 0. The disappeared workpiece visible number J that can be accommodated in the visible region in the disappearance region A becomes 2. The collapsed workpiece visible number K that can be accommodated in the visible region in the collapse region B becomes 1. Therefore, the range R (max (J−(K+I), 1) to max ((J+H)−K, 1)) of the picking-up workpiece number is 1 to 1. Since the range R of the picking-up workpiece number has become one value (the minimum value and the maximum value are the same value) and has become the desired pick-up number (1 in the present embodiment), the workpiece W is conveyed to the delivery position.

Figure 10A:
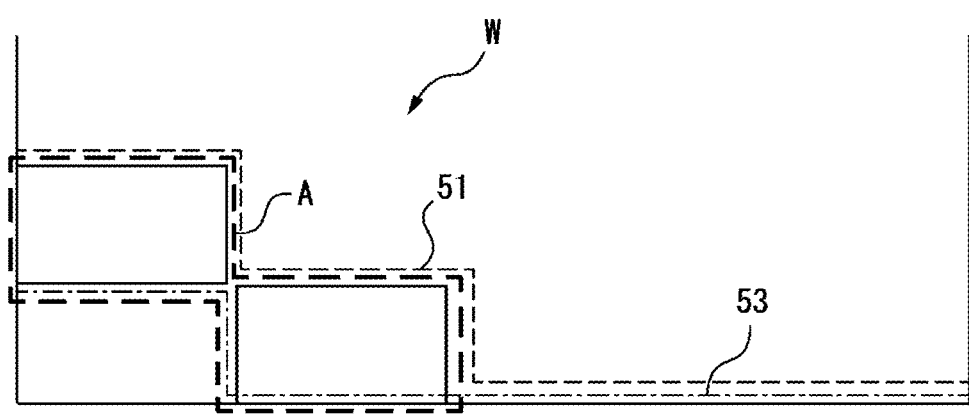
FIG. 10A is a side view illustrating still another example of the workpiece loading region before picking-up a workpiece.
Figure 10B:
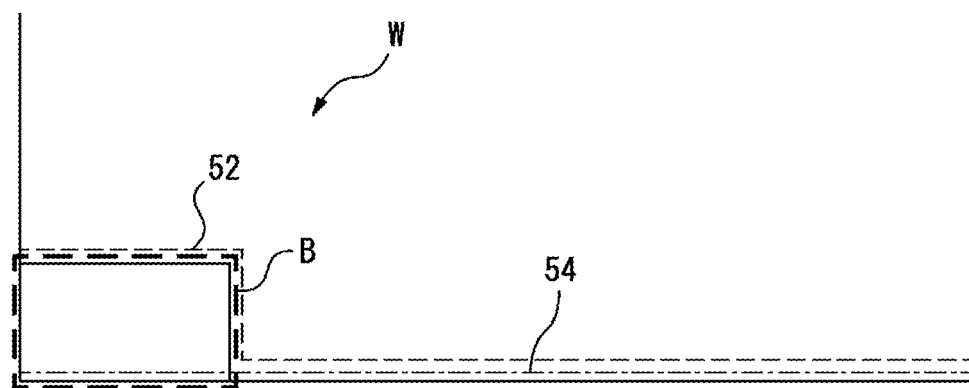
FIG. 10B is a side view illustrating still another example of the workpiece loading region after picking-up a workpiece.

Still another example of the workpiece loading region will be described. FIGS. 10A and 10B are side views illustrating another example of the workpiece loading region before and after picking-up a workpiece. FIG. 10A illustrates the workpiece loading region before picking-up a workpiece, in which two rectangular workpieces W having short sides and long sides are laid down horizontally, and one workpiece W on the left side is caught by one workpiece W on the right side and floats by one workpiece W. FIG. 10B illustrates the workpiece loading region after picking-up a workpiece, in which one workpiece W on the right side has been picked-up and the workpiece W on the left side has fallen like land subsidence. The vision sensor 5 images the workpiece loading region from above and outputs three-dimensional information 51 (indicated by broken line) before picking-up a workpiece and three-dimensional information 52 (indicated by broken line) after picking-up a workpiece.

In the calculation processing of the picking-up workpiece number of the first embodiment (see step S10), the range J to J+H of the disappeared workpiece number that can be accommodated in the disappearance region A becomes 2 to 2. On the other hand, since the collapse region B (negative region or positive region) cannot be specified even if a difference between the three-dimensional information 51 before picking-up a workpiece and the three-dimensional information 52 after picking-up a workpiece is obtained, the range K to K+I of the collapsed workpiece number that can be accommodated in the collapse region B erroneously becomes 0 to 0 (originally 1 to 1) even if the collapse region B actually exists. Therefore, the range R (max (J−(K+I), 1) to max ((J+H)−K, 1)) of the picking-up workpiece number erroneously becomes 2 to 2, and becomes one value (the minimum value and the maximum value are the same value). However, since the picking-up workpiece number (2) has not become the desired pick-up number (1 in the present embodiment), the workpiece W is delivered to the original place or the temporary placement stand, and the workpiece W is picked-up again, and thus malfunction of the hand system 1 can be prevented. However, when the desired pick-up number is 2, there is a possibility that only one workpiece W is erroneously conveyed to the delivery position. However, when the registration information includes the picking-up workpiece number (1), by checking the calculated picking-up workpiece number (2) based on the picking-up workpiece number (1) of the registration information, and thus it is possible to prevent malfunction of the hand system 1.

In the calculation processing of the picking-up workpiece number of the second embodiment (see steps S21 to S24), since no invisible region exists in the disappearance region A, the disappeared workpiece invisible number H that can be accommodated in the invisible region in the disappearance region A becomes 0. Since no invisible region exists in the collapse region B, the collapsed workpiece invisible number I that can be accommodated in the invisible region in the collapse region B becomes 0. The disappeared workpiece visible number J that can be accommodated in the visible region in the disappearance region A becomes 2. However, even if a difference between the invisible three-dimensional information 53 before pick-up and the invisible three-dimensional information 54 after pick-up are obtained from the three-dimensional information 52 after pick-up, the visible region (positive region) in the collapse region B cannot be specified, and therefore, even if the collapse region B actually exists, the collapsed workpiece visible number K that can be accommodated in the visible region in the collapse region B erroneously becomes 0. Therefore, the range R (max (J−(K+I), 1) to max ((J+H)−K, 1)) of the picking-up workpiece number erroneously becomes 2 to 2, and becomes one value (the minimum value and the maximum value are the same value). However, since the picking-up workpiece number (2) has not become the desired pick-up number (1 in the present embodiment), the workpiece W is delivered to the original place or the temporary placement stand, and the workpiece W is picked-up again, and thus malfunction of the hand system 1 can be prevented. However, when the desired pick-up number is 2, there is a possibility that only one workpiece W is erroneously conveyed to the delivery position. However, when the registration information includes the picking-up workpiece number (1), by checking the calculated picking-up workpiece number (2) based on the picking-up workpiece number (1) of the registration information, and thus it is possible to prevent malfunction of the hand system 1.

As illustrated in FIGS. 10A and 10B, when the workpiece W falls immediately below only by one workpiece W as if land subsidence occurs, it is not possible to determine whether the workpiece W has been picked-up and the disappearance region A has been generated or whether the workpiece W has subsided. Therefore, there is a possibility that an erroneous range R of the picking-up workpiece number is calculated. However, it is considered that the possibility of causing the malfunction of the hand system 1 is reduced by combining other methods such as determining whether or not the range R of the picking-up workpiece number has become the desired pick-up number (1 in the present embodiment) or checking the range R of the picking-up workpiece number based on the registration information. Note that when the workpiece W falls by two or more workpieces W, the picking-up workpiece number calculating unit 44 preferably outputs an error.

A hand system 1 of the third embodiment will be described. The hand system 1 of the third embodiment is different from the hand system 1 of the first embodiment in not including the registration sensor 6 because the hand system 1 of the third embodiment uses vision sensor 5 as the registration sensor. The vision sensor 5 measures and outputs three-dimensional information of a target space including the workpiece loading region in which the plurality of workpieces W are loaded (in bulk or stacked) and the hand 2 that picks-up the workpieces W. In the present embodiment, the vision sensor 5 is installed at a fixed point of a different place from the hand 2 and the convey device 3, and thus the vision sensor 5 outputs three-dimensional information of the target space including the hand 2 that picks-up the workpiece W. In other embodiments, when the vision sensor 5 outputs three-dimensional information of the target space including the hand 2, the vision sensor 5 may be attached to the hand 2 or the convey device 3 as in the first embodiment. It should be noted that the description for the same configuration and the same operation as those of the hand system 1 of the first embodiment will be omitted below.

With reference to FIG. 2 again, when the operation control unit 45 moves the convey device 3 to a standby position after picking-up a workpiece, the registration information acquiring unit 43 acquires the three-dimensional information 52 after picking-up a workpiece from the vision sensor 5. Based on the three-dimensional information 52 after picking-up a workpiece, the registration information acquiring unit 43 generates registration information indicating whether or not one or more workpieces W have been picked-up by the hand 2, and sends the generated registration information to the picking-up workpiece number calculating unit 44.

Figure 12:
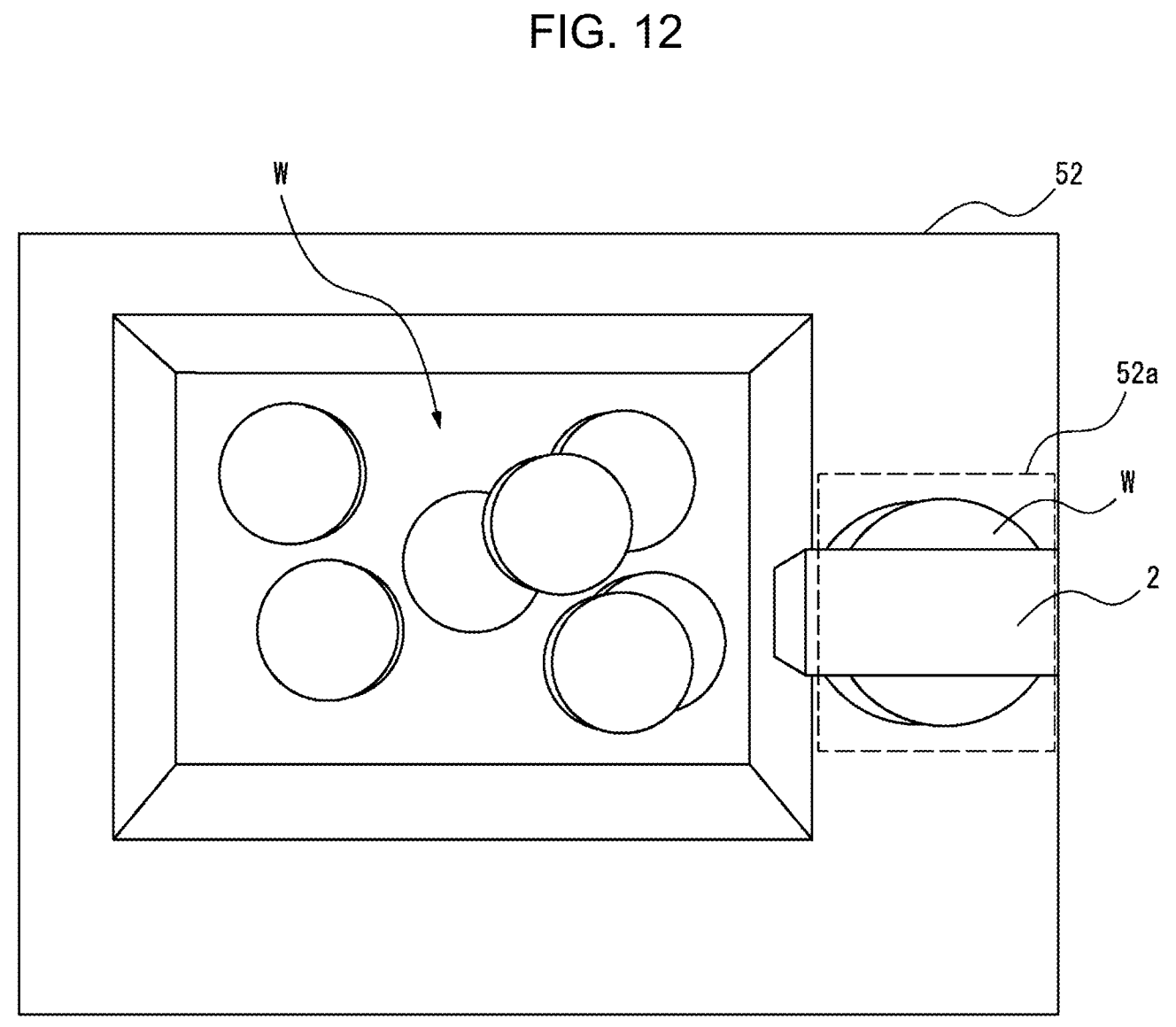

FIG. 12 is a distance image view illustrating an example of the three-dimensional information 52 after picking-up a workpiece. The registration information acquiring unit 43 of the present embodiment sets in advance a registration confirmation region 52*a* including the hand 2 in the three-dimensional information 52 after picking-up a workpiece. The registration information acquiring unit 43 detects the workpiece W from the registration confirmation region 52*a* using image processing such as matching processing, and generates registration information indicating whether or not one or more workpieces W have been picked-up with the hand 2. When the registration information indicates that one or more workpieces W have been picked-up, the picking-up workpiece number calculating unit 44 executes the calculation processing of the range of the picking-up workpiece number. When the registration information indicates that no workpiece W has been picked-up, the picking-up workpiece number calculating unit 44 does not execute the calculation processing of the range of the picking-up workpiece number, and sends the picking-up workpiece number to the operation control unit 45 as 0. This can prevent unnecessary calculation processing by the picking-up workpiece number calculating unit 44.

The registration information acquiring unit 43 may calculate the picking-up workpiece number from the registration confirmation region 52*a* using image processing. When the registration information includes the picking-up workpiece number, the picking-up workpiece number calculating unit 44 preferably checks the calculated picking-up workpiece number based on the picking-up workpiece number of the registration information when the calculated range of the picking-up workpiece number becomes one value (the minimum value and the maximum value are the same value) and becomes the desired pick-up number (1 in the present embodiment).

According to the hand system 1 of the third embodiment, since the vision sensor 5 is used as the registration sensor, it is not necessary to prepare a registration sensor separate from the vision sensor 5, and the hand system 1 of low cost can be provided. Unnecessary calculation processing by the picking-up workpiece number calculating unit 44 can be prevented.

The above-described computer program may be provided by being recorded in a computer-readable non-transitory recording medium, for example, a CD-ROM or the like, or may be provided by being distributed from a server device on a wide area network (WAN) or a local area network (LAN) in a wired or wireless manner.

Although various embodiments have been described in the present description, it should be recognized that the present invention is not limited to the above-described embodiments, and various modifications can be made within the scope set forth in the claims.

The invention claimed is:

1. A picking-up workpiece number calculation device, comprising:
   a processor configured to:
      acquire three-dimensional information of a target space in which a plurality of workpieces are loaded;
      acquire shape information of the workpiece; and
      calculate a range of a picking-up workpiece number, based on the three-dimensional information of the target space before and after picking-up a workpiece and the shape information of the workpiece, in consideration of a cavity in a loading region of the workpiece.

2. The picking-up workpiece number calculation device of claim 1, wherein
   the processor is configured to calculate the range of the picking-up workpiece number, based on a range of a disappeared workpiece number that can be accommodated in a disappearance region disappeared from the loading region after picking-up workpiece.

3. The picking-up workpiece number calculation device of claim 2, wherein
   the processor is configured to calculate the range of the picking-up workpiece number, in consideration of a range of a collapsed workpiece number that can be accommodated in a collapse region newly appeared in the loading region of the workpiece after picking-up workpiece.

4. The picking-up workpiece number calculation device of claim 3, wherein
   the processor is configured to:
      subtract a minimum number of the collapsed workpiece number from a maximum number of the disappeared workpiece number to obtain a maximum value of the picking-up workpiece number; and
      subtract a maximum number of the collapsed workpiece number from a minimum number of the disappeared workpiece number to obtain a minimum value of the picking-up workpiece number, to calculate the range of the picking-up workpiece number.

5. The picking-up workpiece number calculation device of claim 1, further comprising:
   a display configured to display at least one of:
      a range of a disappeared workpiece number that can be accommodated in a disappearance region disappeared from the loading region of the workpiece after picking-up workpiece;
      a range of a collapsed workpiece number that can be accommodated in a collapse region newly appeared in the loading region of the workpiece after picking-up workpiece, depending on a case;
      a range of the picking-up workpiece number calculated based on the range of the disappeared workpiece number and the range of the collapsed workpiece number depending on a case; and the picking-up workpiece number when a maximum value and a minimum value of the range of the picking-up workpiece number match.

6. The picking-up workpiece number calculation device of claim 5, wherein the display is configured to display a superimposed image in which a shape model of the workpiece is superimposed on a place that is a calculation basis of at least one of a range of the disappeared workpiece number, a range of the collapsed workpiece number depending on a case, and a range of the picking-up workpiece number.

7. The picking-up workpiece number calculation device of claim 1, wherein the processor is configured to specify a change region changed in the loading region after picking-up workpiece by obtaining a difference of the three-dimensional information of the target space before and after picking-up workpiece.

8. The picking-up workpiece number calculation device of claim 7, wherein the change region includes at least one of:

a disappearance region disappeared from the three-dimensional information of the target space after picking-up workpiece; and a collapse region newly appeared in the three-dimensional information of the target space after picking-up workpiece.

9. The picking-up workpiece number calculation device of claim 1, wherein the processor is configured to:

acquire registration information indicating whether or not one or more of the workpieces have been picked up; and determine whether or not to execute calculation processing of the range of the picking-up workpiece number, based on the registration information.

10. The picking-up workpiece number calculation device of claim 1, wherein the processor is configured to control operation of at least one of a hand configured to pick up and deliver the workpiece and a convey device configured to convey the workpiece using the hand, based on the range of the picking-up workpiece number.

11. The picking-up workpiece number calculation device of claim 10, wherein the processor is configured to give the hand a command for operation of repeating picking-up and delivery of the workpiece until the range of the picking-up workpiece number becomes one value and becomes a desired picking-up number.

12. A hand system, comprising:

a hand configured to pick up and deliver a workpiece;

a convey device configured to convey a workpiece using the hand;

a controller configured to control operation of at least one of the hand and the convey device; and a vision sensor configured to output three-dimensional information of a target space in which a plurality of the workpieces are loaded, wherein the controller includes a processor configured to:

acquire the three-dimensional information of the target space from the vision sensor;

acquire shape information of the workpiece;

calculate a range of a picking-up workpiece number, based on the three-dimensional information of the target space before and after picking-up a workpiece and the shape information of the workpiece, in consideration of a cavity in a loading region of the workpiece; and control operation of at least one of the hand and the convey device, based on the range of the picking-up workpiece number.

13. The hand system of claim 12, further comprising:

a registration sensor configured to output registration information indicating whether or not one or more workpieces have been picked up, wherein the processor is configured to determine whether or not to execute calculation processing of the range of the picking-up workpiece number, based on the registration information.

14. A display device configured to visually display a calculating process of a picking-up number of the workpieces picked up from a plurality of loaded workpieces, the display device comprising:

a display configured to display a superimposed image in which a change region changed in a loading region of the workpieces after picking-up workpiece is displayed such that the change region is superimposed on at least one of pieces of three-dimensional information of a target space before and after picking-up workpiece so as to be identifiable.

15. The display device of claim 14, wherein the change region includes at least one of:

a disappearance region disappeared from the loading region after the picking-up workpiece; and a collapse region newly appeared in the loading region after the picking-up workpiece, depending on a case, and the display is configured to identify and display at least one of the change region, the disappearance region, and the collapse region depending on a case.

* * * * *